Figure 1:
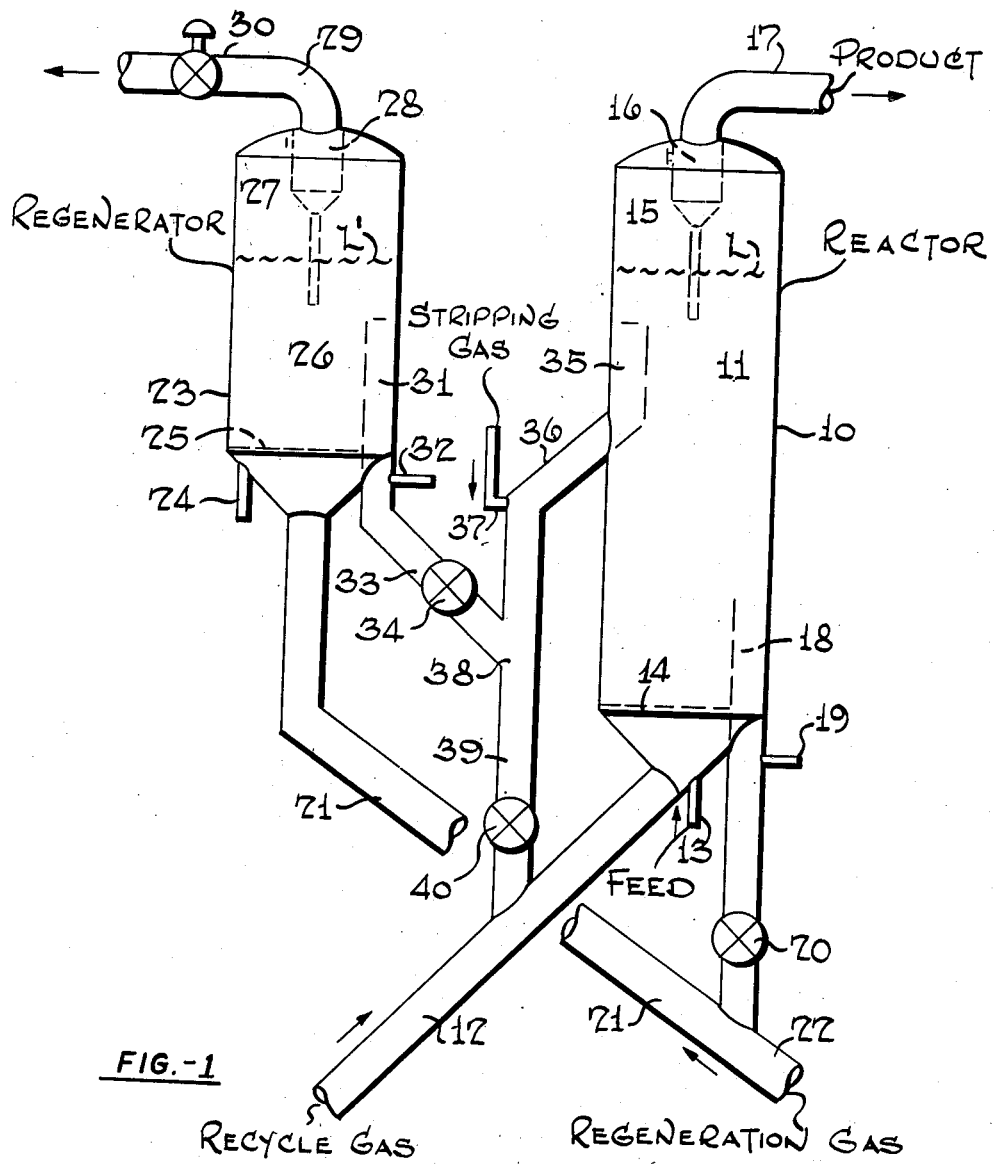

United States Patent Office 2,700,639
Patented Jan. 25, 1955

2,700,639

FLUID HYDROFORMING

John Weikart, Westfield, N. J., assignor to Standard Oil Development Company, a corporation of Delaware Application December 26, 1951, Serial No. 263,360

5 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or hydrogen-rich recycle gas at temperatures of 750°–1150° F. in the pressure range of about 50–1000 lbs. per sq. inch, and in contact with such catalysts as molybdenum oxide, chromium oxide, or, in general, oxides or sulfides of metals of groups IV, V, VI, VII and VIII of the periodic system of elements alone, or generally supported on a base or spacing agent such as alumina gel, precipitated alumina or zinc aluminate spinel. A good hydroforming catalyst is one containing about 10 weight per cent molybdenum oxide upon an aluminum oxide base prepared by heat treating a hydrated aluminum oxide or upon a zinc aluminate spinel.

It has been proposed in application Serial No. 188,236, filed October 3, 1950, to effect the hydroforming of naphtha fractions in a fluidized solids reactor system in which naphtha vapors are passed continuously through a dense, fluidized bed of hydroforming catalyst particles in a reaction zone, spent catalyst particles being withdrawn from the dense bed in the reaction zone and passed to a separate regeneration zone where inactivating carbonaceous deposits are removed by combustion whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the bed and (4) the regeneration or reconditioning of the catalyst may be readily controlled.

A particular advantage of the foregoing fluid solids operation has been the fact that the freshly regenerated catalyst can be utilized to carry part of the necessary heat requirements for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment involving at least a partial reduction of a higher oxide of the catalytic metal formed during regeneration to a form of lower oxide of the catalytic metal which is more catalytically active during its passage through the transfer line into the reaction zone. In view of the high temperature of the regenerated catalyst (1050°–1200° F.) and the exothermic character of the reaction between the hot, freshly regenerated catalyst and the hydrogen-rich gas, it is necessary to make the transfer line of small diameter and as short as possible in order to keep the time of contact of the regenerated catalyst and hydrogen-containing gas sufficiently short to avoid overtreatment and/or thermal degradation of the catalyst.

It is the object of this invention to provide a novel method for treating freshly regenerated hydroforming catalyst preparatory to recycling the same to a fluidized solids hydroforming reactor.

It is also the object of this invention to provide a method and apparatus whereby freshly regenerated hydroforming catalyst may be treated at relatively low temperatures while effectively utilizing the hot regenerated catalyst for supplying at least about twenty-five per cent of the heat required for the hydroforming reaction.

It is a further object of this invention to provide a simple method and apparatus whereby hot, freshly regenerated hydroforming catalyst may be effectively cooled prior to contact with hydrogen-containing gas and still supply a substantial amount of the heat required for the hydroforming operation.

These and other objects will appear more clearly from the detailed specification and claims which follow.

It has now been found that freshly regenerated hydroforming catalyst can be pretreated with a hydrogen-containing gas at relatively low temperatures for any desired period while still effectively supplying a part of the heat required for the hydroforming reaction by intermixing the hot regenerated catalyst, preferably after stripping the same free of combustion gases, with a stream of catalyst withdrawn from the reactor in sufficient amount to reduce the temperature of the regenerated catalyst to the level desired for the pretreatment and then contacting the resultant catalyst mixture with a hydrogen-containing gas for a sufficient period to partially reduce the catalytic metal oxide and convert the same to its most catalytically active form whereupon the treated mixture is discharged into the main reaction zone. In this way, the freshly regenerated catalyst is readily brought to the temperature most suitable for the hydrogen pretreatment before contact with hydrogen-containing gas while at the same time the sensible heat contained in the freshly regenerated catalyst is transferred to the reactor catalyst and conveyed thereby into the reaction zone thereby reducing the amount of heat that must be supplied to the reaction zone by circulation of preheated or superheated recycle gas and/or by preheating of the naphtha feed. The reactor catalyst mixed with the freshly regenerated catalyst also serves to absorb some of the heat generated by the action of the hydrogen upon the regenerated catalyst.

Figure 2:
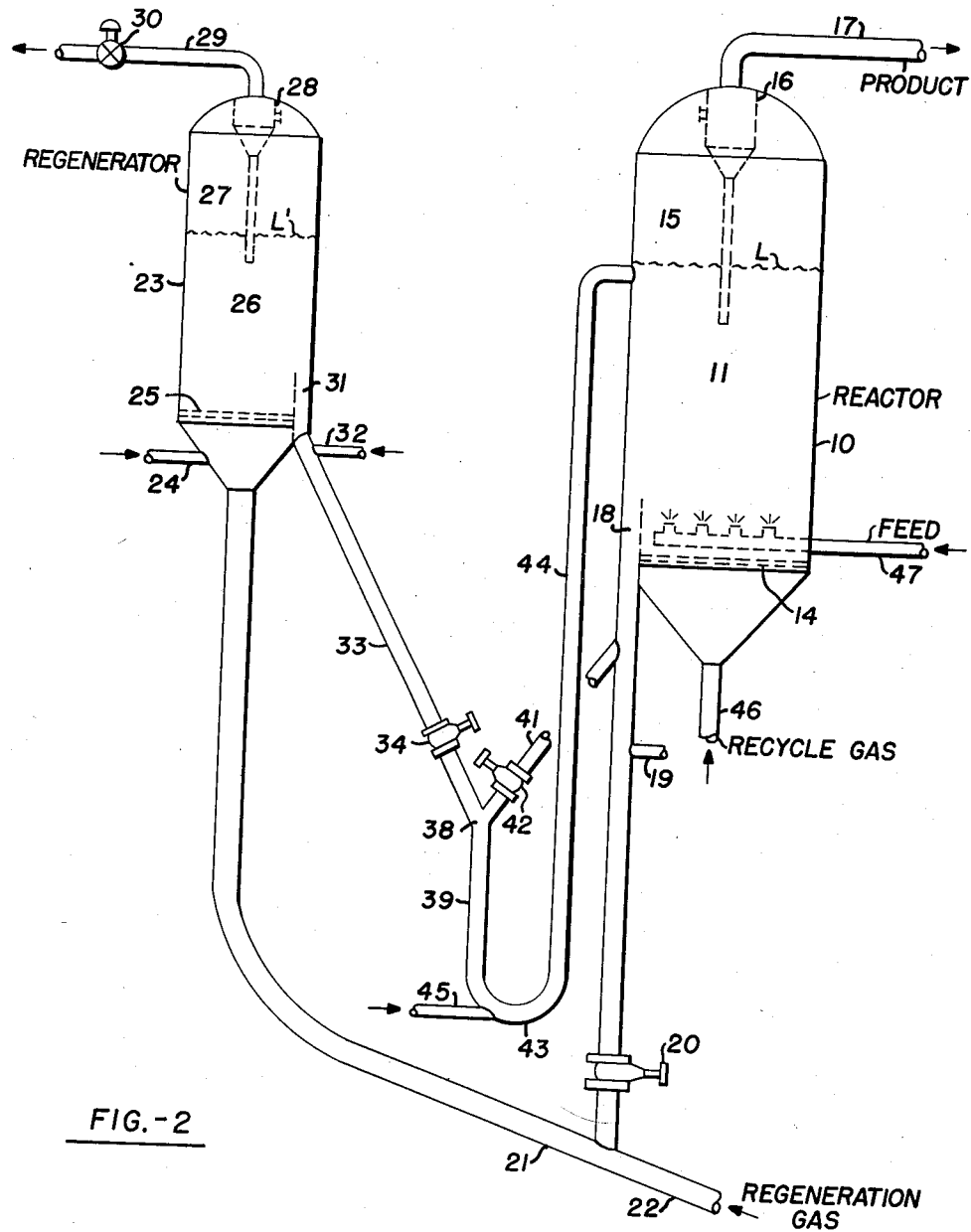

Reference is made to the accompanying drawings in which Fig. 1 is a diagrammatic illustration of one embodiment of this invention and Fig. 2 is a diagrammatic illustration of a system in which the regenerated catalyst is recycled to the upper part of the dense fluidized catalyst bed in the reaction zone.

In Fig. 1 of the drawing, 10 is a reactor vessel which may desirably be a vertical cylindrical vessel of considerable length and which is charged with a hydroforming catalyst such as molybdenum oxide upon an alumina support which is in a finely divided form and maintained as a dense fluidized turbulent bed 11 by the passage therethrough of hydrogen-rich gas introduced through inlet line 12 and vaporized hydrocarbons introduced through inlet line 13. A perforated plate or grid 14 is preferably provided near the bottom of the reactor vessel in order to insure uniform distribution of the incoming constitutents over the entire cross-section of the vessel. The bed 11 has a definite level L and is superposed by a dilute or disperse phase 15 comprising gaseous or vaporous reaction products containing a small amount of catalyst entrained therein. The reaction products are taken overhead from reactor vessel 10, preferably after passage through a cyclone separator 16 which serves to knock out entrained catalyst which is then returned to the dense bed 11 via the dip pipe provided at the bottom of separator 16. The reaction products pass overhead through line 17 to suitable fractionating, stabilizing and/or storage equipment.

Means are provided for the withdrawal of a stream of catalyst directly from the dense bed 11. This may be in the form of a cell or conduit 18 arranged entirely within the reactor below the level L of the dense bed as shown or it may extend above dense bed level L and be provided with one or more ports or restricted passageways below level L for the discharge of catalyst into said conduit. It may alternatively comprise a conduit arranged externally of the reactor 10 and connected to the reactor by means of a suitable connector conduit. A gas such as steam, nitrogen or the like is supplied to conduit 18 at one or more points such as 19 in order to strip out entrained reaction products or vaporizable materials from the spent catalyst particles and thereby minimize the amount of combustible material carried by the spent catalyst to the regenerator.

The conduit 18 serves also as a standpipe for developing the fluistatic pressure necessary to overcome the pressure drop through the regeneration system. Although the catalyst flowing in the conduit or standpipe 18 will ordinarily carry entrained or trapped gas with it in an amount sufficient to maintain it in freely flowing fluid condition one or more taps may be provided along the lower portion thereof to facilitate start-up of the equipment or to take care of emergencies that might arise. The stripped spent catalyst is discharged from conduit 18 through slide valve 20 into spent catalyst riser 21 where it is picked up by a stream of air or regeneration gas supplied through inlet line 22 and is conveyed into regenerator vessel 23. In order to prevent overheating of the catalyst upon contact with the regeneration gas or air only a part of the air, generally not more than about 15% to 40% of the total air required for regeneration is supplied through inlet line 22 to convey the spent catalyst through riser 21 into regenerator 23. The remainder of the air necessary for regeneration is supplied to regenerator 23 through inlet line 24. In order to insure uniform distribution of the incoming air and catalyst over the entire cross-section of the regeneration vessel it may be desirable to provide a perforated plate or distribution grid 25 at the lower end of the regenerator vessel. The velocity of the regeneration gases through vessel 23 is so controlled as to form a dense, fluidized, liquid simulating bed 26 of catalyst particles and gas having a definite level L' superposed by a dilute or disperse phase 27. Regeneration gases are taken overhead from regenerator 23 through a cyclone separator 28 or the like which removes entrained catalyst and returns the separated catalyst to the dense bed 26 via the dip leg attached to the bottom of the cyclone. The regeneration gases are then passed via outlet line 29 through a pressure reducing or release valve 30 and thence to a waste gas stack or to suitable scrubbing and storage means if it is desired to utilize this gas for stripping in the system.

In view of the fact that the oxidative reactions that occur in the regenerator generate more heat than can normally be transferred to the reactor by the circulating catalyst at low catalyst to oil ratios, without exceeding safe temperature limits, it is generally advisable to provide cooling coils in the regenerator to control the temperature therein. A very desirable arrangement is to provide a primary cooling coil entirely below the dense bed level L' and a secondary cooling coil partly below and partly above the dense bed level L' to permit adjustment of the heat exchange capacity by simply varying the dense bed level L' in the regenerator.

Regenerated catalyst is withdrawn from dense bed 26 through conduit 31 which extends downwardly through the dense bed 26, the grid member 25 and the bottom of the regenerator vessel. Stripping gas is introduced into conduit 31 at 32 and, if desired, at further points along the transfer line 33. Stripping of the regenerated catalyst may be effected with air, nitrogen or flue gas or mixtures of these. It is preferred to introduce air at 32 to strip and/or effect a final clean up of the regenerated catalyst and then to purge the stream of regenerated catalyst by introducing a small amount of nitrogen in the transfer line 33. If flue gas is used for stripping the regenerated catalyst, it is preferred to wash it free of carbon dioxide and carbon monoxide since it is advisable to exclude these gases from the reaction zone. The flow of stripped regenerated catalyst through standpipe or transfer line 33 is controlled by a slide valve 34 or the like.

A conduit 35 is arranged in the upper part of reactor vessel 10 for the withdrawal of a second stream of reactor catalyst particles directly from the dense bed 11. The particular form of this withdrawal conduit is immaterial. The stream of catalyst particles withdrawn through conduit 35 is passed downwardly through conduit 36. Stripping gas such as recycle gas, methane, or the like is introduced at one or more points 37 in order to strip off or reduce the amount of hydrocarbon reactants entrained in this stream of reactor catalyst.

The regenerated catalyst transfer line and standpipe 33 are connected to reactor catalyst circulation conduit or standpipe 36 at 38. In this way the stream of stripped regenerated catalyst is mixed with the stream of reactor catalyst in sufficient amount to give a mixture of catalyst particles having a temperature below about 1050° F. and preferably about 1000° F. The mixture of regenerated catalyst and reactor catalyst passes downwardly through control or slide standpipe 39 and is discharged through control or slide valve 40 into inlet line 12 where the catalyst particles are picked up by a stream of hydrogen-rich recycle gas and conveyed thereby through transfer line 12 into the reactor. In view of the lowered temperature of the regenerated catalyst and the presence of about an equal amount or more of recycle reactor catalyst, the exothermic reaction between the regenerated catalyst and hydrogen is readily controlled and contact of the hydrogen-containing gas and the recycle or hydrogen-containing gas may be continued for as long as 15 minutes or more without adversely affecting the catalyst. Ordinarily contact of the regenerated catalyst with hydrogen-containing gas for from a few seconds to a minute or so will suffice to effect the pretreatment or conversion of the regenerated catalyst to its most active form.

It is not intended that the invention be limited to that shown in the schematic diagram of Fig. 2. For example, reactor solids are shown to circulate externally from top to bottom of the dense bed, but small changes as illustrated in Fig. 2 would permit flow from bottom to top to provide an inverse temperature gradient across the reactor bed. Furthermore, the cyclone separator dip legs might provide all or a portion of the circulating solid stream.

Referring to Fig. 2, the same basic two-vessel system is illustrated and the corresponding parts bear the same reference numerals as in Fig. 1. In the embodiment shown in Fig. 2 a catalyst withdrawal line 18 is arranged in the reactor, and this is provided with an inlet line 19 for the introduction of stripping gas the same as in Fig. 1. However, instead of providing a separate catalyst withdrawal well for supplying reactor catalyst for intermixture with the freshly regenerated catalyst, reactor catalyst withdrawal line 41 is connected to the catalyst withdrawal line 18. This withdrawal line 41 may be provided with a valve 42 for the control of the supply of reactor catalyst to standpipe 39 and for intermixture with freshly regenerated catalyst. In this embodiment the mixture of reactor catalyst and freshly regenerated catalyst is not discharged from standpipe 39 into the main stream of recycle gas for recycling to the bottom of the reactor vessel, but is transferred through a U-bend 43 or the like and riser line 44 to the upper part of reactor dense bed 11. Recycle gas, a small part of the total recycle gas supplied to the reaction zone, can be introduced through line 45 to assist in conveying the mixture of regenerated and reactor catalyst through the riser line 44 to the upper part of the main reactor dense bed. The major portion of the recycle gas is supplied to the reactor through inlet line 46, while the preheated naphtha vapor feed is supplied through inlet line 47 to a distributor ring or the like for insuring uniform distribution of naphtha over the entire cross section of the reactor vessel 10.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800°–1050° F., preferably about 1000° F. The naphtha preheat should be as high as possible while avoiding thermal degradation thereof as by limiting the time of residence in the furnace and transfer or feed inlet lines. The preheated feed stock may be supplied to the reaction vessel for admixture with hydrogen-rich recycle gas below the grid member 14 or it may be introduced through a distributor ring, or the like, arranged above the grid. The recycle gas, which contains from about 50 to 80 vol. per cent hydrogen is preheated to temperatures of about 1150°–1300° F., preferably about 1200° F., prior to the introduction thereof into inlet line 12. The recycle gas should be circulated through the reactor at a rate of from about 1000 to 8000 cu. ft. per barrel of feed. The amount of recycle gas used is preferably the minimum amount that will suffice to introduce the necessary heat of reaction and keep carbon formation at a low level.

The reactor system is charged with a mass of finely divided hydroforming catalyst particles. Suitable catalysts include group VI metal oxides, such as molybdenum oxide, chromium oxide or tungsten oxide or mixtures thereof upon a carrier such as activated alumina, zinc aluminate spinel or the like. Preferred catalysts contain about 5 to 15 weight per cent molybdenum oxide or from about 10 to 40 weight per cent chromium oxide upon a suitable carrier. If desired minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850° and 925° F., preferably about 900° F. and at pressures between 50 and 500 lbs. per sq. inch, preferably about 200 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch ordinarily results in increased carbon formation which becomes excessive in most cases at pressures below about 75 lbs. per sq. inch. Above 200 lbs., however, catalyst selectivity to light products ($C_4$'s and lighter) increases rapidly. The regenerator vessel is normally operated at essentially the same pressure as the reactor vessel and at temperatures of about 1050°–1200° F. The residence time of the catalyst in the reactor is of the order of from 2 to 4 hours and in the regenerator of from about 3 to 15 minutes.

The weight ratio of catalyst-to-oil introduced into the reactor should be about 0.5 to 1.5. It is preferred to operate at catalyst-to-oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide or alumina gel catalyst may vary, for example, from about 1.5 wt./hr./wt. to about 0.15 wt./hr./wt.

Since the temperature in the regenerator is maintained between about 1050° and about 1200° F. the regenerated catalyst discharged to the standpipe 39 zone will be at substantially the same temperature. Reactor catalyst recycle through line 36 to standpipe 39 is conducted at such a rate as to reduce the temperature of the freshly regenerated catalyst to a temperature of 1050° F. or below, preferably to about 950° to 1000° F. Since the cooling of the regenerated catalyst is effected by direct heat exchange with recycle reactor catalyst, the sensible heat of the freshly regenerated catalyst is effectively transferred to the reactor zone. Moreover, because of the reduced temperature of the regenerated catalyst and the heat absorption capacity of the recycle reactor catalyst, it is possible to control the temperature and/or the time of pretreatment of the regenerated catalyst in transfer line 12 so as to avoid thermal degradation or over-treatment of the catalyst. The residence time of the catalyst in transfer line may be from 5 to 20 seconds although at the temperatures indicated, the residence time may be as long as 10–15 minutes without having any detrimental effects upon the catalyst.

The following examples are illustrative of the present invention:

Example I

In order to determine the effect of temperature on the rate and extent of reduction of molybdena, experiments were carried out at atmospheric pressure in which a molybdena-alumina catalyst and pure $MoO_3$ were contacted with a stream of pure hydrogen at various temperatures for extended periods of time. The data are summarized below.

| | Temp., °F. | Equivalent Form of Molybdena | |
|---|---|---|---|
| | | After 6 Hrs. | After 40 Hrs. |
| 10% $MoO_3$ on Alumina [1] | 900 | $Mo_2O_5$ | 70% $Mo_2O_5$+30% $MoO_2$. |
| | 1,200 | $Mo_2O_5$ | Mo. |
| C. P. $MoO_3$ | 900 | $MoO_2$ | $MoO_2$. |
| | 1,000 | $MoO_2$ | $MoO_2$. |
| | 1,100 | $Mo_2O$ | Mo. |

[1] Regenerated at 1,200° F. to convert all molybdenum to $MoO_3$ prior to reduction.

These experiments show that the $MoO_3$ on the alumina base is less easily reduced than the pure $MoO_3$ (unsupported). At normal reaction temperatures for hydroforming (about 900° F.), it requires an exceedingly long time to reduce the molybdenum on the catalyst significantly below an equivalent oxidation state of $Mo_2O_5$. At temperatures up to almost 1100° F., the pure unsupported molybdenum can be easily reduced in $H_2$ below $Mo_2O_5$ but not below $MoO_2$. At the high temperatures of 1100°–1200° F. desirable commercially from the standpoint of simplicity of equipment, and, hence, of economics, the molybdenum can be readily reduced below $MoO_2$ and even to metallic molybdenum. This is representative of over-pretreatment, and poor catalyst activity results.

Example II

The results of over-pretreatment in relation to catalyst activity and selectivity may be seen from the following experiments carried out on a continuous 50 B./D. fluid hydroforming pilot plant with a 10% $MoO_3$ on alumina catalyst and feeding a 200°–350° F. virgin Louisiana naphtha at 900° F., 200 p. s. i. g., 0.2 w./hr./w., 1 C./O., 4000 C. F./B., with complete regeneration of the catalyst.

| 50 B./D. Unit Run No. | 6C–1 | 6D–1 | 6E–1 | 6B–3 |
|---|---|---|---|---|
| Pretreating Temperature, °F. | 1,000 | 1,100 | 1,160 | 1,150 |
| Pretreating Time, Sec. | 2–3 | 2–3 | 2–3 | 60–90 |
| Valence State [1] of Reactor Catalyst | 4.9 | 4.7 | 4.7 | 4.5 |
| CFR–R Clear O.N. of $C_5$–430° F. Gasoline Produced | 97.4 | 94.1 | 94.0 | 87.4 |
| Yield of $C_5$–430° F. Gasoline at 90 CFR–R Octane No., Vol. Percent | 84 | 82 | 81 | 79.5 |

[1] The valence state is defined as follows: $MoO_3$=valence of 6.0; $Mo_2O_5$=valence of 5.0; $MoO_2$=valence of 4.0. Thus, an average valence state of 4.5 could be made up of equal parts of $MoO_2$ and $Mo_2O_5$. However, the average valence state alone does not give any exact information about the types of oxides present for an average valence state of 4.5 could be represented equally well by 1 part of $MoO_3$ and 3 parts of $MoO_2$.

It is apparent from the above experiments that the more reduced states resulted in poorer catalyst activity and selectivity, and this is probably due to some of the molybdena being reduced, under the more severe reducing conditions, to the very low oxides, or even metallic molybdenum, which have little or no catalytic activity. For maximum catalyst activity, an average valence state close to 5.0 is desirable, and this can readily be controlled by carrying out the pretreatment at low temperatures.

Example III

Additional experiments were carried out in a batch-fluid cyclic hydroforming pilot unit feeding a 200°–350° F. virgin Louisiana naphtha over 10% $MoO_3$ on alumina catalyst at 200 p. s. i. g., 900° F., 0.3 w./hr./w., 3000 C. F./B. gas rate, for 4-hour hydroforming periods. The time and temperature of pretreating the catalyst before each hydroforming period were varied and the following results were obtained.

| Pretreat Conditions | | Catalyst Activity (Octane No. of Product at 0.3 W./Hr./W.) | Catalyst Selectivity (Yield of 90 CFR-R Octane No. Product, Vol. Percent |
|---|---|---|---|
| Time, Min. | Temp., °F. | | |
| 1 | 900 | 91 | 83 |
| 15 | 900 | 91 | 82 |
| 1 | 1,150 | 89 | 80 |
| 15 | 1,150 | 87 | 79 |

Here again it is shown that both the activity and selectivity of the catalyst are impaired by pretreating at high temperatures for times of the order of one minute or more, and the longer the time at high temperature, the poorer the results. On the other hand, extending the time of pretreating at low temperatures to as much as 15 minutes has no appreciable effect on the catalyst.

Thus it is seen from the above-described experiments that carrying out catalyst pretreatment at low temperatures insures optimum catalyst activity and selectivity, and eliminates the necessity for critical and difficult control over the time of pretreatment.

The foregoing description contains a limited number of embodiments of the present invention. It will be understood, however, that numerous modifications may be made by those skilled in this art without departing from the spirit of this invention.

What is claimed is:

1. In a process for hydroforming hydrocarbons in contact with finely divided hydroforming catalyst particles comprising a group VI metal oxide upon a support in accordance with the fluidized solids technique at temperatures of about 850–925° F., at pressures between about 50 and 500 lbs. per sq. inch and at catalyst-to-oil weight ratios of about 0.5 to 1.5, the improvement which comprises continuously withdrawing a stream of catalyst particles from the hydroforming reaction zone, regenerating the withdrawn catalyst particles by burning carbonaceous deposits therefrom at temperatures of 1050°–1200° F., withdrawing a second stream of catalyst from the reaction zone, mixing this second stream of reactor catalyst with hot, freshly regenerated catalyst particles in sufficient amount to lower the temperature of the latter to below 1050° F., thereafter treating the said mixture of freshly regenerated catalyst and reactor catalyst at said lower temperature with a hydrogen-rich gas and recycling the hydrogen treated mixture of regenerated and reactor catalyst particles at temperatures above average reaction zone temperatures to the reaction zone.

2. In a process for hydroforming hydrocarbons in contact with finely divided hydroforming catalyst particles comprising a grop VI metal oxide upon a support in accordance with the fluidized solids technique at temperatures of about 850–925° F., at pressures between about 50 and 500 lbs. per sq. inch and at catalyst to oil weight ratios of about 0.5 to 1.5, the improvement which comprises continuously withdrawing a stream of reactor catalyst particles from a dense fluidized bed of catalyst particles in the hydroforming reaction zone, discharging the stream of withdrawn catalyst particles into a regeneration zone, regenerating the said catalyst particles by burning carbonaceous deposits therefrom at temperatures of from 1050°–1200° F., withdrawing a stream of regenerated catalyst particles from a dense, fluidized bed of catalyst particles in the regeneration zone, withdrawing a second stream of reactor catalyst particles from the dense fluidized bed of catalyst particles in the hydroforming reaction zone, mixing the stream of regenerated catalyst particles with the second stream of reactor catalyst to lower the temperature of the regenerated catalyst to below 1050° F., thereafter treating the resultant mixture of regenerated and reactor catalyst particles at said lower temperature with a hydrogen-rich gas and recycling the hydrogen-treated mixture of regenerated and reactor catalyst particles at temperatures above average reaction zone temperatures to the hydroforming reaction zone.

3. The process as defined in claim 2 in which the second stream of reactor catalyst is withdrawn from the upper part of the dense fluidized bed in the reaction zone and the hydrogen treated mixture of catalyst particles is recycled to the lower part of the reaction zone.

4. The process as defined in claim 2 in which the second stream of reactor catalyst is withdrawn from the lower part of the dense fluidized bed in the reaction zone and the hydrogen treated mixture is recycled to the upper part of the dense fluidized bed in the reaction zone.

5. The process as defined in claim 2 in which the second stream of reactor catalyst is contacted countercurrently with a substantially inert stripping gas to reduce the amount of reactant materials entrained in said second stream before it is brought into contact with the stream of regenerated catalyst.

References Cited in the file of this patent

UNITED STATES PATENTS

| | | |
|---|---|---|
| 2,345,487 | Liedhold | Mar. 28, 1944 |
| 2,366,372 | Voorhees | Jan. 2, 1945 |
| 2,472,844 | Munday et al. | June 14, 1949 |